United States Patent [19]

Shadeck et al.

[11] Patent Number: 5,476,273
[45] Date of Patent: Dec. 19, 1995

[54] PLASTIC GRIP BOOTS FOR CHUCKS

[75] Inventors: Louis M. Shadeck, Anderson; Robert O. Huff, Piedmont; Valerie Owens, Townville, all of S.C.

[73] Assignee: Power Tool Holders Incorporated, Wilmington, Del.

[21] Appl. No.: 228,651

[22] Filed: Apr. 18, 1994

Related U.S. Application Data

[63] Continuation-in-part of Ser. No. 99,160, Jul. 29, 1993, Pat. No. 5,330,204, which is a continuation of Ser. No. 884,205, May 18, 1992, Pat. No. 5,253,879, which is a division of Ser. No. 449,722, Dec. 11, 1989, Pat. No. 5,125,673.

[51] Int. Cl.$^6$ .................................................. B23B 31/12
[52] U.S. Cl. .................................. 279/60; 279/902
[58] Field of Search ........................ 279/60–65, 902; 264/273, 274

[56] References Cited

U.S. PATENT DOCUMENTS

| | | |
|---|---|---|
| 4,252,333 | 2/1981 | Vogel . |
| 4,460,296 | 7/1984 | Sivertson . |
| 4,582,384 | 4/1986 | Frantz et al. ........................ 264/273 |
| 4,664,394 | 5/1987 | Theissig et al. . |
| 4,695,065 | 9/1987 | Komatsu et al. . |
| 4,951,955 | 8/1990 | Sakamaki . |
| 5,125,673 | 6/1992 | Huff et al. . |
| 5,135,241 | 8/1992 | Huff et al. ........................ 279/902 |
| 5,145,194 | 9/1992 | Huff et al. ........................ 279/62 |
| 5,174,588 | 12/1992 | Reibetanz et al. ................ 279/62 |
| 5,193,824 | 3/1993 | Salpaka ........................... 279/60 |
| 5,234,223 | 8/1993 | Sakamaki . |

FOREIGN PATENT DOCUMENTS

| | | |
|---|---|---|
| 1330065 | 9/1973 | United Kingdom . |
| 1565048 | 4/1980 | United Kingdom . |

OTHER PUBLICATIONS

Yukiwa "Products" brochure.

*Primary Examiner*—Steven C. Bishop
*Attorney, Agent, or Firm*—Fish & Neave; Robert R. Jackson

[57] ABSTRACT

A plastic grip boot for a metal part of a chuck, typically a keyless chuck, is disclosed. The grip boot is insert molded to a rotatable metal part of a chuck, the metal part extending under the grip boot for the axial length of the grip boot which is normally gripped by the user in order to provide support to the grip boot. During molding, the plastic preferably flows into surface features of the metal part to help secure the grip boot to the metal part. The grip boot improves user grip of the metal part during operation of the chuck to adjust the spacing of the chuck jaws.

19 Claims, 8 Drawing Sheets

PLASTIC GRIP BOOTS FOR CHUCKS

This is a continuation in part of application Ser. No. 08/099,160, filed Jul. 29, 1993, now U.S. Pat. No. 5,330,204, which was a continuation of application Ser. No. 07/884,205, filed May 18, 1992, now U.S. Pat. No. 5,253,879, which was a division of application Ser. No. 07/449,722, filed Dec. 11, 1989, now U.S. Pat. No. 5,125,673.

BACKGROUND OF THE INVENTION

This invention relates to grip boots for improving the user's grip on a chuck, especially a keyless chuck. More particularly, this invention relates to plastic grip boots which are insert molded to one or more of the metal parts of a chuck which the user must grip and rotate in order to tighten the chuck on a tool such as a drill bit or in order to loosen the chuck to release the tool. A plastic grip boot is more comfortable to hold and improves the user's grip on the chuck.

Hand-powered, electric-powered, and pneumatic-powered tool drivers commonly include adjustable chucks for holding a tool such as a drill bit. Various chucks have been designed to facilitate adjustment of the spacing of the jaws. One such chuck is a keyless chuck (see, for example, U.S. patent application Ser. No. 08/099,160, filed Jul. 29, 1993, which was a continuation of U.S. patent application Ser. No. 07/884,205, now U.S. Pat. No. 5,253,879, which was a division of U.S. patent application Ser. No. 07/449,722, now U.S. Pat. No. 5,125,673, all of which applications are hereby incorporated by reference in their entireties). This type of chuck provides manual means for restraining one member of the chuck while a torque is applied to another member of the chuck (either manually or by the power driver) to move a nut in the chuck relative to the jaws and thereby change the spacing of the jaws.

Commonly, a torque is manually applied to a sleeve member of the keyless chuck to effect movement of the jaws and thereby adjust the jaws' grip on a tool. The sleeve member may have a knurled surface to improve the user's grip. In the case of a metal sleeve member, however, such a surface may provide only limited improvement of the user's grip. Although a plastic sleeve member might afford a better grip, such a sleeve would have to be strong enough to meet the requirements of a gripping surface.

In view of the foregoing, it is an object of this invention to provide an integral member for improved gripping of a keyless chuck comprising a plastic grip boot which is insert molded to a metal member.

SUMMARY OF THE INVENTION

This and other objects of the invention are accomplished in accordance with the principles of the invention by providing a plastic grip boot which is insert molded to a metal chuck part that is held by the user when adjusting the jaw spacing of a chuck. In order to provide support for the plastic grip boot, and hence allow a relatively thin grip boot, the metal part extends under the grip boot for substantially the length of the grip boot which the user grips. The metal part preferably has surface features to ensure permanent union between the grip boot and metal part. The grip boot preferably has a surface shaped or finished to further enhance the user's grip. The grip boot may be used on either a forward part of the chuck such as a front sleeve, or on a rearward part of the chuck such as a rear sleeve or a rearward portion of the chuck body. If desired, grip boots may be used on both front and rear portions of the chuck. The plastic selected for forming the grip boot should have a relatively high coefficient of friction, and should be sturdy, and scratch- and tear-resistant. The plastic is therefore preferably a structural plastic.

Further features of the invention, its nature, and various advantages will be more apparent from the accompanying drawings (in which like reference characters represent like elements throughout) and the following detailed description of the preferred embodiments.

DETAILED DESCRIPTION OF THE PREFERRED EMBODIMENTS

Figure 1:
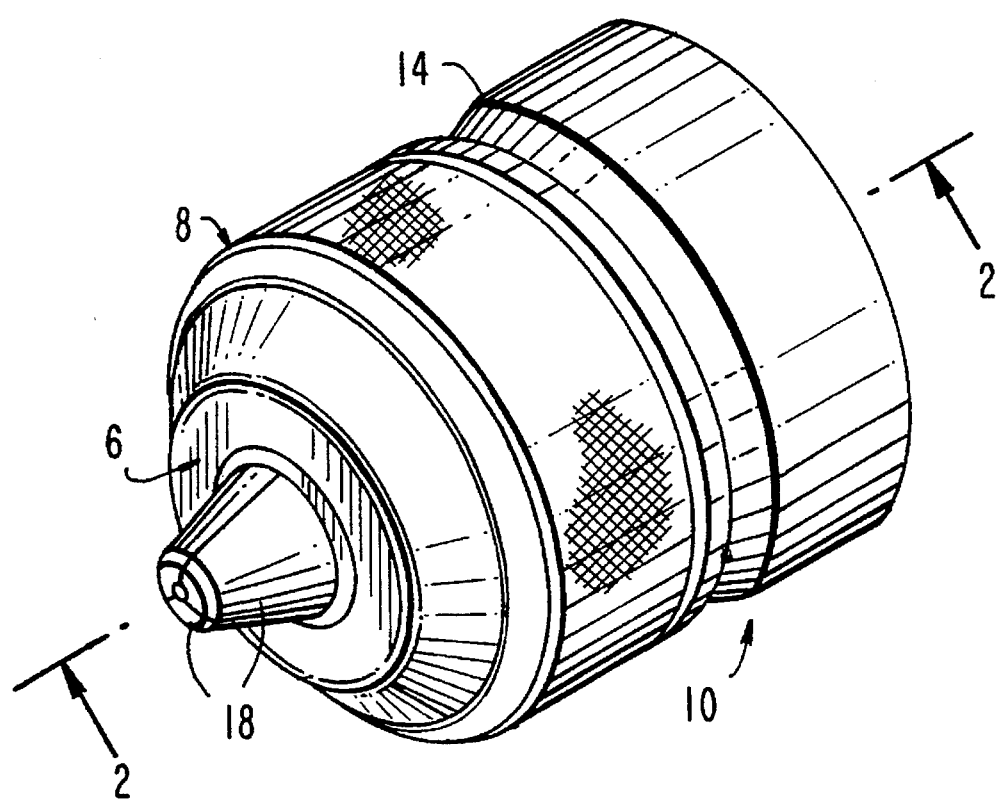
FIG. 1 is a perspective view of an illustrative keyless chuck in accordance with the present invention.

An illustrative keyless chuck 10 constructed in accordance with the principles of the present invention is shown in FIG. 1. Chuck 10 includes a body structure 6, a front sleeve structure 8, an optional rear sleeve member 14, and jaws 18. The general construction and operation of chuck 10 will now be described with reference to the generally similar chuck shown in FIG. 2.

Figure 2:
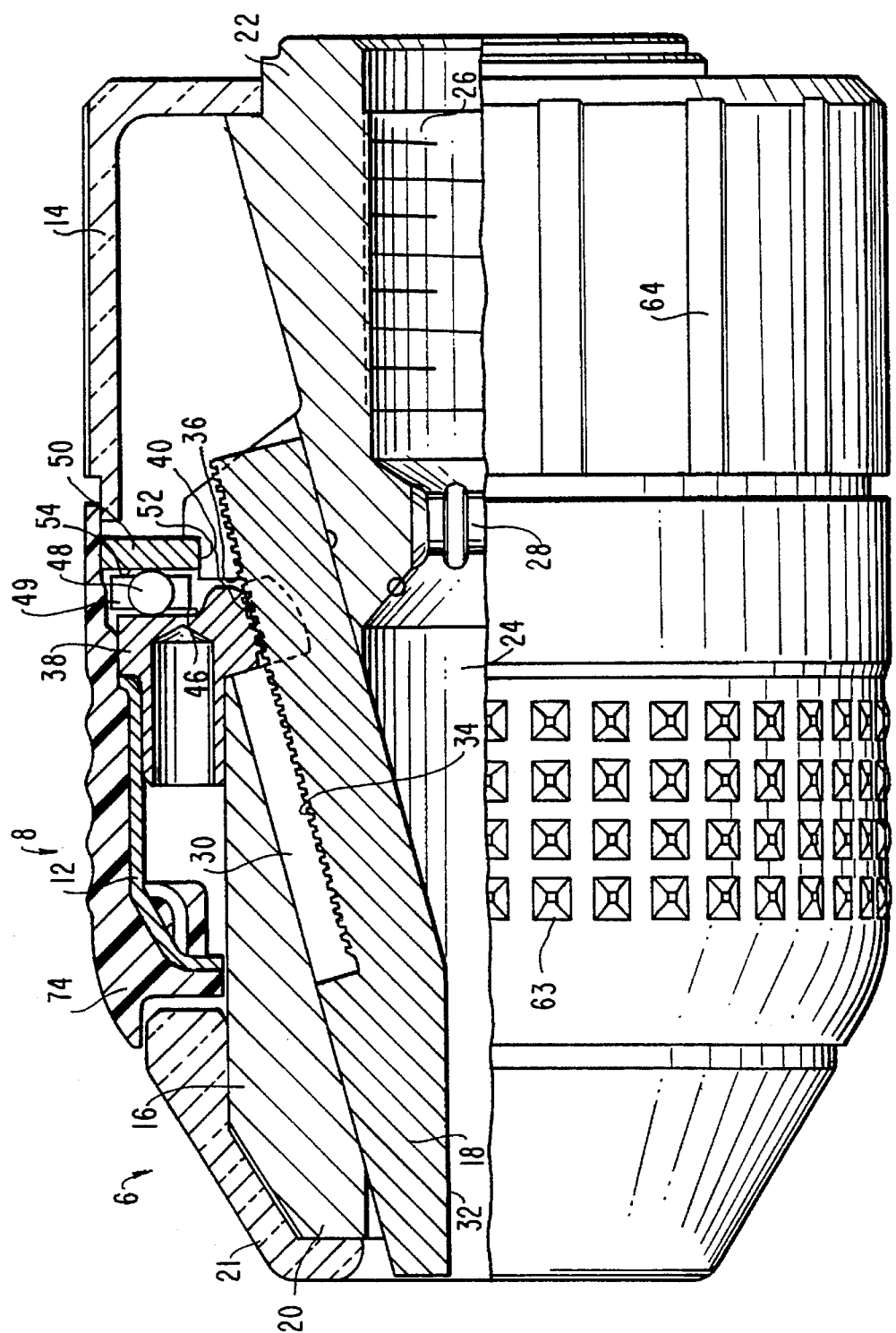
FIG. 2 is an enlarged longitudinal view, partly in section, taken along a line like 2—2 in FIG. 1, but for another illustrative chuck in accordance with this invention which differs in minor and unimportant respects from the chuck shown in FIG. 1.

As is more clearly shown in FIG. 2, typically metal body member 16 is generally cylindrical in shape and comprises a nose or forward section 20 and a tail or rearward section 22. Nose section 20 is preferably chamfered at its outer end. Shield 21 is press fit over nose section 20 and cooperates with plastic grip boot 74 (described below) to give the outer surface of the chuck a relatively continuous profile. Shield 21 is preferably metal and helps to protect grip boot 74 from flying debris which may scratch or otherwise disfigure the outer surface of the grip boot. An axial bore 24 is formed in nose section 20 of body member 16. Axial bore 24 is somewhat larger than the largest tool shank which the chuck is designed to accommodate. A threaded bore 26 is formed in tail section 22 of body member 16 and is of a standard size to mate with the threaded drive shaft of a powered or hand driver (not shown). Bores 24 and 26 may communicate at the central region 28 of body member 16. If desired, threaded bore 26 may be replaced by a tapered, unthreaded bore of a standard size to mate with a tapered drive shaft.

Passageways 30 are formed in body member 16 to accommodate each jaw 18. Preferably, three jaws 18 are employed and each jaw 18 is separated from the adjacent jaw by an arc of 120°. The axes of passageways 30 and jaws 18 are angled with respect to the chuck axis but intersect the chuck axis at a common point ahead of chuck body 16 or in a forward portion of the chuck body. Each jaw 18 has a tool-engaging face 32, which is generally parallel to the axis of chuck body 16, and threads 34 on the opposite or outer surface of the jaw.

A circumferential groove 36 is formed in body member 16 and extends into passageways 30. A nut 38 (which may be split or alternatively unsplit if body 16 is constructed in other known ways), having interior threads 40, is located in circumferential groove 36. Sleeve member 12 is press fit onto nut 38. Front sleeve 12 is formed from a metal (e.g., steel) with a relatively large hoop strength.

A circumferential race 46, which may be grooved or a flat surface, is formed on the rear face of nut 38 to accommodate an anti-friction bearing, for example, ball bearing assembly 48. If desired, bearing assembly 48 may include a bearing retainer 49 which locates a plurality of bearing balls while permitting them to roll. A bearing thrust ring 50 is provided with a central hole 52 sized to be press fit onto body member 16. One face of bearing thrust ring 50 has formed thereon a bearing race 54, which may be grooved or flat, against which bearing assembly 48 rides.

Figure 14:
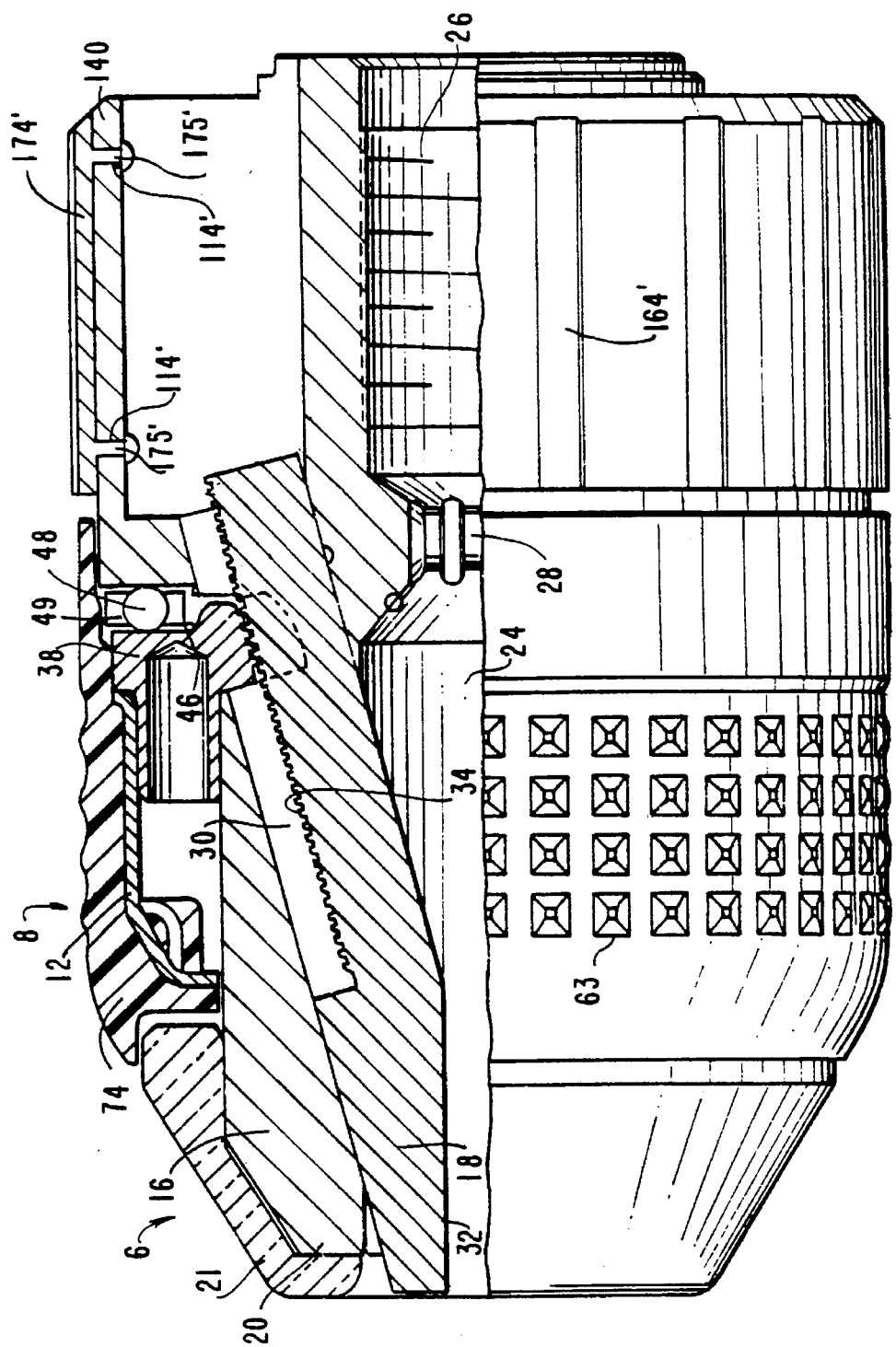
FIG. 14 is another view similar to FIG. 13 showing still another alternative embodiment of the invention.

As shown in FIG. 2, rear sleeve 14 may be a separate metal member which is press fit onto the rear portion 22 of body member 16. Alternatively, as shown in FIG. 14, the rearward portion of body member 16 can be extended radially outward as indicated at 140 to take the place of a separate rear sleeve. As still another alternative (not shown) rear sleeve 14 may be omitted and elements 12 and 74 extended to the tail end of body 16. This alternative is feasible when a spindle lock is provided on the driver or when the driver is used to tighten or loosen the jaws.

From the foregoing it will be apparent that rear sleeve 14 is fixed to body member 16 while grip boot 74 and front sleeve 12 are fixed to split nut 38. Thus, rotation of front sleeve 12 and grip boot 74 relative to rear sleeve 14 will cause jaws 18 to be advanced or retracted, depending on the direction of the relative rotation. Because bearing 48 is interposed between the relatively moving parts, the frictional losses are minimized and a maximum portion of the applied tightening torque is converted to a tightening force on the tool shank. While chuck 10 may be operated entirely manually, it may also be partly operated by the power drive.

In order to improve the user's grip on front sleeve 12, grip boot 74 is included over front sleeve 12. In accordance with the principles of this invention, grip boot 74 is formed over front sleeve 12 using the technique of insert molding. In other words, preformed metal part 12 is used as an insert in the mold in which plastic grip boot 74 is molded so that the plastic becomes integral with the metal. Thereafter, composite element 12/74 is press fit onto nut 38 as described above. Preferably, the surface of grip boot 74 is provided with protrusions 63, or is otherwise configured, to further improve user grip. Front sleeve 12 extends under grip boot 74 in the axial direction for that length of grip boot 74 which is provided with protrusions 63 and hence that length of grip boot 74 which is normally gripped by the user. By extending front sleeve 12 under grip boot 74 for substantially the grippable length of grip boot 74, support is provided for grip boot 74 during user gripping of grip boot 74, and grip boot 74 can be made relatively thin.

Grip boot 74 is formed from a plastic (e.g., a structural or engineering plastic such as glass filled nylon or glass filled polypropylene) that has a high coefficient of friction and thus provides a good grip for the user. Although grip boot 74 has protrusions 63 for improving a user's grip, any other surface finish may be used in order to achieve equivalent improved gripping.

Figure 3:
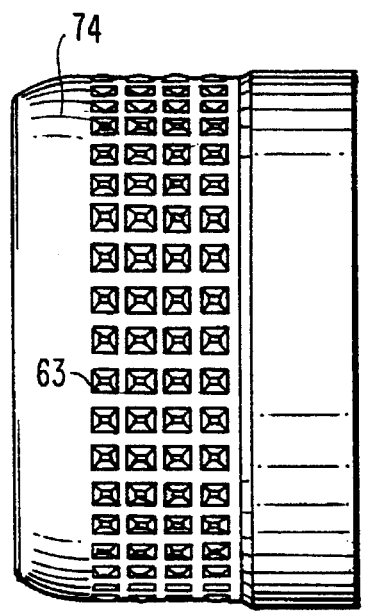
FIG. 3 is a side view of an illustrative grip boot formed over a front metal sleeve of a keyless chuck in accordance with the present invention.
Figure 4:
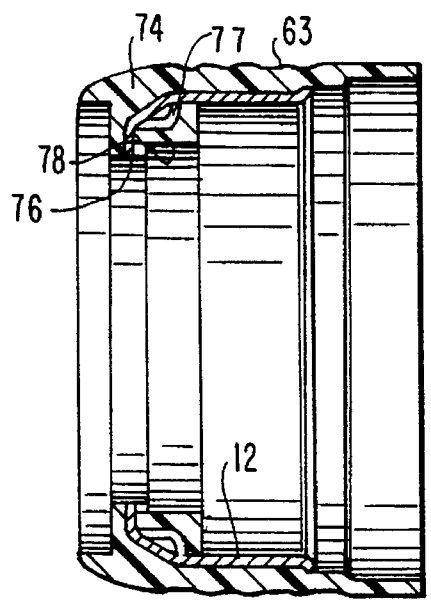
FIG. 4 is a simplified cross sectional view of the grip boot and metal sleeve of FIG. 3.

Front sleeve 12 and grip boot 74 are shown in more detail in FIGS. 3–7. Grip boot 74 of FIG. 2, which is formed over front sleeve 12, is shown in isolation in FIG. 3. A cross-section of the grip boot 74 over front sleeve 12 combination of FIG. 3 is shown in FIG. 4. In order to strengthen the bond formed between front sleeve 12 and grip boot 74, surface features which allow plastic of grip boot 74 to interengage with front sleeve 12 are preferred. To this end, front sleeve 12 has a front, radially inwardly extending portion 76 in which openings 77 are formed within the boundaries of portion 76 (see also FIGS. 5–7). The plastic of grip boot 74 flows through openings 77 during the insert molding process so that an inner annular bead 78 of plastic inside sleeve 12 is formed integrally with outer plastic grip boot 74. Bead 78 helps to securely fasten grip boot 74 onto front sleeve 12 and thereby prevent rotation of grip boot 74 relative to front sleeve 12 during rotation of the two in adjusting jaws 18.

Figure 5:
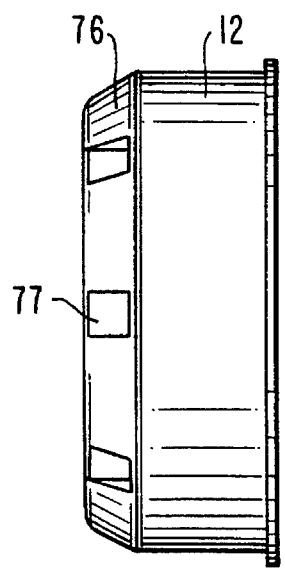
FIG. 5 is a side view of the metal sleeve over which the grip boot of FIG. 4 is molded.
Figure 6:
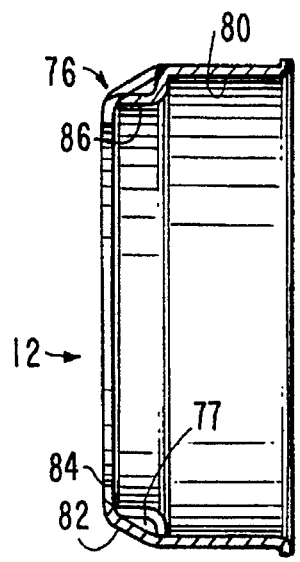
FIG. 6 is a simplified cross sectional view of the metal sleeve of FIG. 5.
Figure 7:
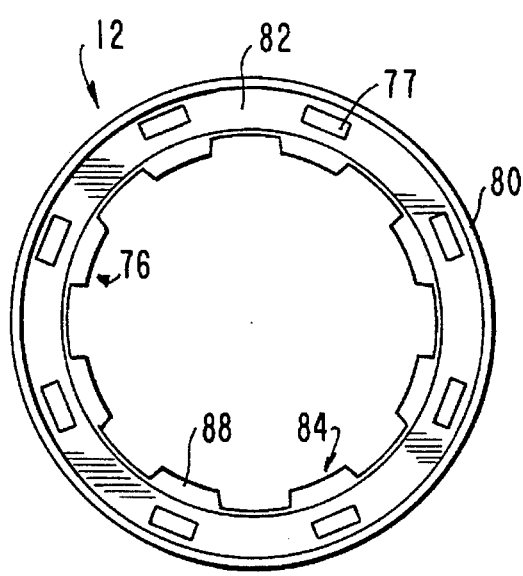
FIG. 7 is a front view of the metal sleeve of FIGS. 3–6.

Front sleeve 12 of FIGS. 2 and 4 is shown more clearly in isolation in FIGS. 5–7. Front sleeve 12 is formed of metal and therefore can be relatively thin. Front sleeve 12 supports and reinforces plastic grip boot 74 so that the grip boot can also be relatively thin. As shown in FIG. 5, openings 77 are preferably evenly spaced apart around sloping portion 76 of front sleeve 12. As a consequence of the interengagement of grip boot 74 and front sleeve 12, it can be seen from FIGS. 5–7 that a circumferential path of fixed radius from the central longitudinal axis of the chuck passes through alternating regions of metal from front sleeve 12 and plastic from grip boot 74 as the path is traced circumferentially around the chuck.

A cross-sectional view of front sleeve 12 in FIG. 6 reveals that front sleeve 12 includes a thin tubular portion 80 from which portion 76 extends. Portion 76 includes (1) an angled portion 82 which is angled radially inwardly relative to tubular portion 80, and (2), extending radially inwardly from the free edge of angled portion 82, an annular flange portion 84 which is substantially perpendicular to tubular portion 80. As shown in FIG. 6, openings 77 are punched-in areas of angled portion 82. Thus, the bottom 86 of each opening 77 is a small indented section of angled portion 82. Apertures through sleeve 12 are formed between bottom 86 and the remaining unaltered portions of angled portion 82. Molten plastic flows through these apertures during insert molding of grip boot 74 over front sleeve 12.

A front view of front sleeve 12 (FIG. 7) reveals that flange portion 84 of portion 76 preferably includes teeth 88 for further enhancing interengagement between grip boot 74 and front sleeve 12. Molten plastic flows through the gaps between teeth 88 to interdigitate with teeth 88. Grip boot 74 is thereby even more firmly secured onto front sleeve 12.

Figure 8:
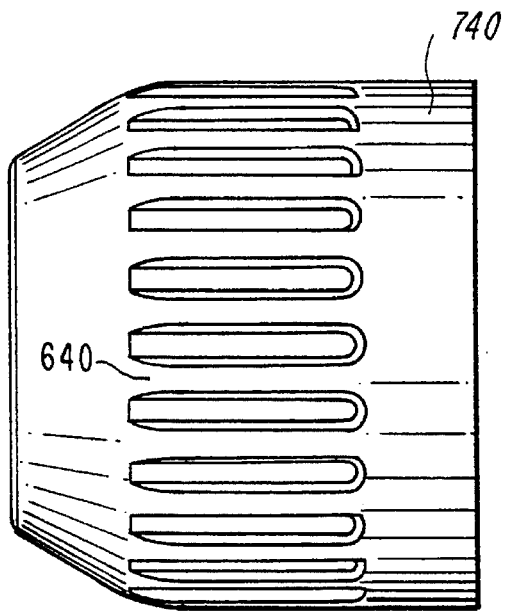
FIG. 8 is a side view of another illustrative embodiment of a grip boot formed over a front metal sleeve of a keyless chuck in accordance with the present invention.
Figure 9:
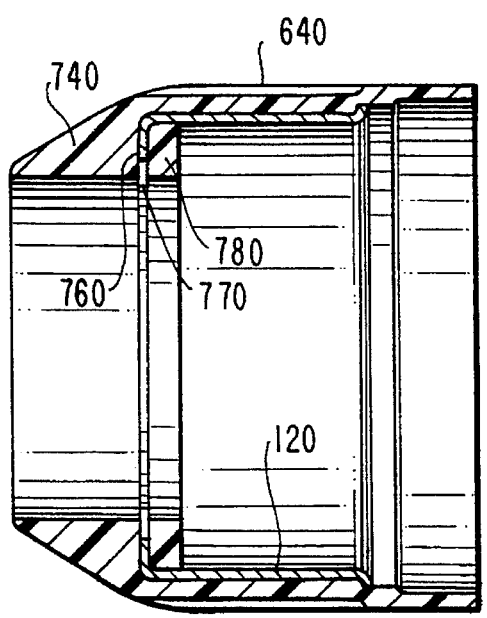
FIG. 9 is a simplified cross sectional view of the grip boot and metal sleeve of FIG. 8.

An alternative grip boot 740, formed over an alternative front sleeve 120, is shown in FIGS. 8–12. As shown in FIG. 8, grip boot 740 has ribs 640 for improving a user's grip. However, any other surface finish may be used in order to achieve equivalent improved gripping. A cross-section of the grip boot 740 over front sleeve 120 combination of FIG. 8 is shown in FIG. 9. Front sleeve 120 has a front, radially inwardly extending flange 760 in which openings 770 are formed between teeth 880 (see also FIGS. 10–12). During insert molding, plastic of grip boot 740 flows through openings 770 to integrally interconnect grip boot 740 and an annular bead 780 of plastic that forms inside sleeve 120 behind flange 760. Bead 780 helps to securely fasten grip boot 740 onto front sleeve 120 and thereby prevent rotation of grip boot 740 relative to front sleeve 120 during rotation of the two in adjusting jaws 18.

Figure 10:
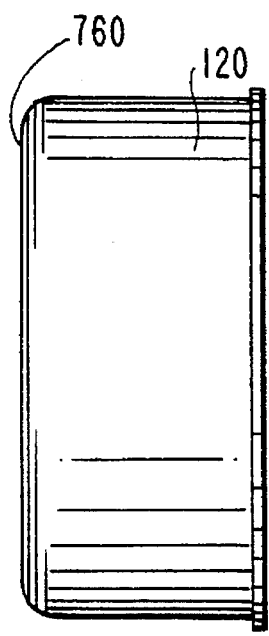
FIG. 10 is a side view of the metal sleeve over which the grip boot of FIG. 9 is molded.
Figure 11:
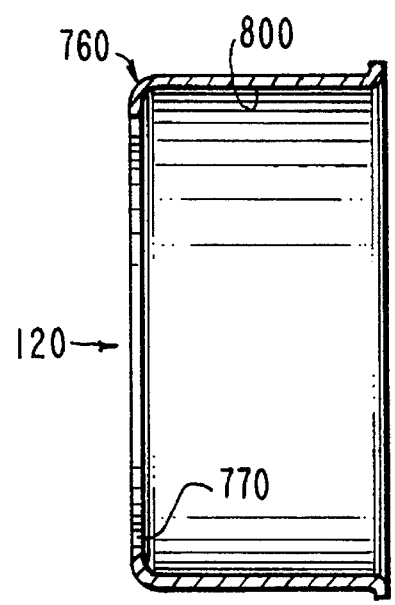
FIG. 11 is a simplified cross sectional view of the metal sleeve of FIG. 10.
Figure 12:
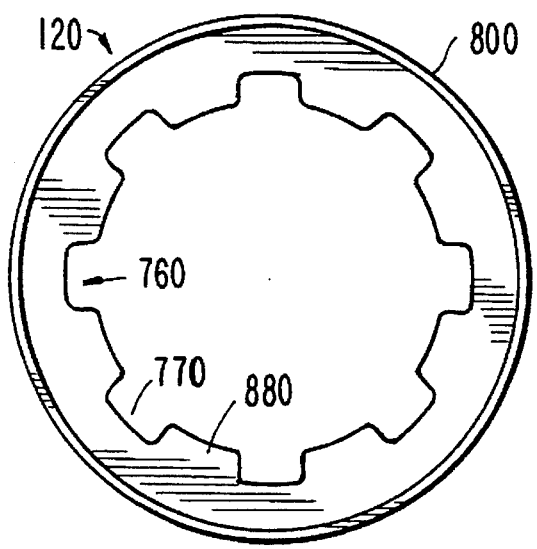
FIG. 12 is a front view of the metal sleeve of FIGS. 8–11.

Alternative front sleeve 120 is shown in isolation in FIGS. 10–12. Modified front sleeve 120 is formed of metal and therefore can be relatively thin. As shown in FIG. 10, front sleeve 120 has a radially inwardly extending flange 760. As is more easily seen in cross-section in FIG. 11, front sleeve 120 includes a thin tubular portion 800 from which flange 760 extends. Openings 770 are formed in the inner free edge of flange 760.

A front view (FIG. 12) of modified front sleeve 120 reveals that flange 760 preferably includes teeth 880 (between openings 770) for more secure rotational attachment of grip boot 740 to front sleeve 120. As mentioned above, molten plastic flows through openings 770 between teeth 880 to interdigitate with teeth 880. Grip boot 740 is thereby firmly rotationally secured to front sleeve 120.

It will be appreciated that front sleeve 120 is functionally similar to front sleeve 12. It will further be appreciated that a plastic grip boot may also be formed on all or a portion of rear sleeve 14 or an equivalent rear structure of the chuck as will now be discussed in more detail with reference to FIGS. 13 and 14.

Figure 13:
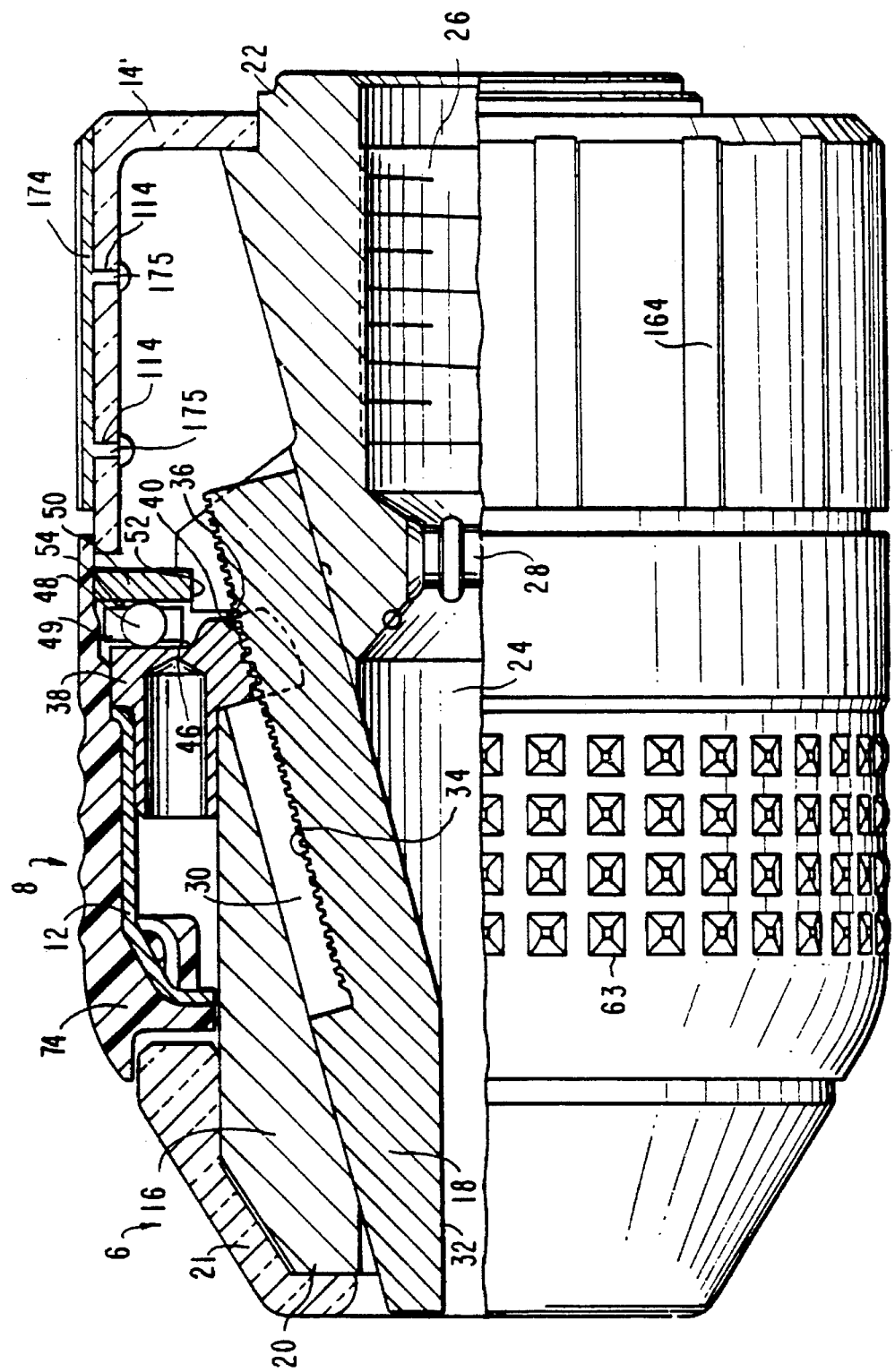
FIG. 13 is a view similar to FIG. 2 showing another alternative embodiment of the invention.

The chuck of FIG. 13 is similar to the chuck of FIG. 2 except that rear metal sleeve 14' is surrounded by an annular plastic grip boot 174 that may be similar in material to grip boot 74. Grip boot 174 is formed with raised axial ribs 164 to facilitate the manual application of torque to the grip boot and thus to sleeve 14' and chuck body 16. Grip boot 174 is insert molded onto sleeve 14'. Sleeve 14' extends axially under grip boot 174 for that length of grip boot 174 which has raised axial ribs 164 (which in this embodiment is the entire length of grip boot 174). Sleeve 14' also extends slightly beyond grip boot 74 in the axial direction in order to seal the gap between grip boots 74 and 174 and hence keep internal surfaces free from contaminants such as debris from the drilling process. Sleeve 14' preferably is formed with radial apertures 114 through which plastic 175 from grip boot 174 passes during molding in order to help rotationally and axially secure grip boot 174 to sleeve 14'.

In the further alternative shown in FIG. 14, body member 16 extends radially out at 140 to take the place of a separate sleeve 14 or 14'. This construction can also eliminate the need for a separate bearing race 50 by allowing bearings 48 to bear directly on body 16 (assuming that the material of body 16 is suitable). The radially outer portion 140 of body 16 is surrounded by an annular plastic grip boot 174' that may be similar in all respects to grip boot 174 in FIG. 13. Thus again grip boot 174' may be formed with raised axial ribs 164' to facilitate the manual application of torque to the grip boot and thereby to chuck body 16. Grip boot 174' is insert molded onto chuck body 16. Outer portion 140 again extends axially under grip boot 174' for that length of grip boot 174' which has raised axial ribs 164'. Chuck body portion 140 may be formed with radial apertures 114' through which grip boot plastic 175' passes during molding in order to help rotationally and axially secure grip boot 174' to chuck body portion 140.

It will be understood that the foregoing is only illustrative of the principles of this invention, and that various modifications can be made by those skilled in the art without departing from the scope and spirit of the invention. For example, a different mechanism for adjusting the jaw grip may be utilized. Additionally, the arrangement of the nut and the bearing thrust ring with respect to the front sleeve and the rear sleeve shown in the applications incorporated by reference herein are applicable to the present invention. The described embodiments are presented for the purpose of illustration rather than limitation, and the present invention is limited only by the claims which follow.

What is claimed is:

1. In a chuck having a longitudinal axis, a first member substantially concentric with said axis, a second member substantially concentric with said axis, a plurality of jaws spaced from one another around said axis, and means responsive to relative rotation of said first and second members about said axis for changing the spacing between said jaws, at least one of said first and second members being metal and having a radially outer surface which is substantially concentric with said axis, the improvement comprising:

a plastic grip boot which is insert molded to said outer surface of said metal member, said outer surface of said metal member extending parallel to said axis and under said grip boot for the axial length of said grip boot which is normally gripped by a user during adjustment of said spacing between said jaws, in order to provide support for said grip boot along the axial length of said grip boot which is normally gripped by the user.

2. The apparatus defined in claim 1 wherein the thickness of said plastic grip boot is only a small fraction of the axial length of said grip boot so that said plastic grip boot does not project significantly out from said outer surface of said metal member in a radial direction.

3. The apparatus defined in claim 1 wherein said outer surface is annular, and wherein said plastic grip boot is also annular.

4. The apparatus defined in claim 1 wherein said plastic grip boot has a plurality of radially outwardly projecting surface features for improving a user's grip on said grip boot.

5. The apparatus defined in claim 1 wherein said outer surface of said metal member has a plurality of radial apertures into which plastic of said grip boot extends in order to help secure said grip boot to said outer surface of said metal member.

6. The apparatus defined in claim 1 wherein said outer surface of said metal member has a plurality of radial protrusions which extend radially into plastic of said grip boot in order to help secure said grip boot to said outer surface of said metal member and prevent relative rotation about said axis between said outer surface of said metal member and said grip boot.

7. The apparatus defined in claim 1 wherein said outer surface of said metal member further comprises a radially inwardly extending flange, said flange having a plurality of radial protrusions which extend radially into plastic of said grip boot in order to help secure said grip boot to said outer surface of said metal member and prevent relative rotation about said axis between said outer member of said metal member and said grip boot.

8. The apparatus defined in claim 1 wherein the spacing between said jaws is changed to allow said chuck to selectively grip and release tools of various sizes which extend distally from a distal end of said chuck, wherein said outer surface is on a proximal portion of said chuck, and wherein said chuck further comprises a second, gripable, radially outer surface which is distal of said proximal portion and which is rotatable about said axis relative to said outer surface and the grip boot on said outer surface.

9. The apparatus defined in claim 8 further comprising:
a main body in which said jaws are mounted for reciprocation to change the spacing between said jaws, and wherein said outer surface is fixed relative to said main body.

10. The apparatus defined in claim 9 wherein said outer surface is a surface of said main body.

11. The apparatus defined in claim 9 wherein said outer surface is a surface of a metal sleeve member that is fixed relative to said main body.

12. The apparatus defined in claim 11 wherein said sleeve member is press fitted onto said main body.

13. The apparatus defined in claim 8 wherein said second gripable surface is the radially outer surface of a second plastic grip boot.

14. The apparatus defined in claim 13 wherein said second plastic grip boot is insert molded to an outer surface of another metal member of said chuck which is rotatable by and with said second plastic grip boot.

15. The apparatus defined in claim 14 wherein said means responsive to relative rotation of said first and second members comprises a nut which is threadedly engaged with said jaws, and wherein said second plastic grip boot is fixedly attached to said nut.

16. The apparatus defined in claim 15 wherein said further metal member comprises a metal sleeve.

17. The apparatus defined in claim 16 wherein said metal sleeve is fixedly attached to said nut.

18. The apparatus defined in claim 17 wherein said metal sleeve is press fitted onto said nut.

19. In a chuck having a longitudinal axis, a first member substantially concentric with said axis, a second member substantially concentric with said axis, a plurality of jaws spaced from one another around said axis, and means responsive to relative rotation of said first and second members about said axis for changing the spacing between said jaws, at least one of said first and second members being metal and having a radially outer surface which is substantially concentric with said axis, the improvement comprising:
a plastic grip boot which is insert molded to said outer surface of said metal member, said outer surface of said metal member having surface features such that a circumferential path of fixed radius from said axis passes alternately through regions of said metal member and regions of plastic from said grip boot as said path is traced circumferentially around said axis.

* * * * *